(12) United States Patent
Isozu et al.

(10) Patent No.: US 9,077,885 B2
(45) Date of Patent: Jul. 7, 2015

(54) INFORMATION PROCESSING APPARATUS, INFORMATION PROCESSING METHOD, AND PROGRAM

(75) Inventors: Masaaki Isozu, Tokyo (JP); Kazuhiro Watanabe, Tokyo (JP)

(73) Assignee: Sony Corporation, Tokyo (JP)

(*) Notice: Subject to any disclaimer, the term of this patent is extended or adjusted under 35 U.S.C. 154(b) by 384 days.

(21) Appl. No.: 13/613,935

(22) Filed: Sep. 13, 2012

(65) Prior Publication Data

US 2013/0147844 A1 Jun. 13, 2013

(30) Foreign Application Priority Data

Dec. 9, 2011 (JP) ................................. 2011-270250

(51) Int. Cl.
*G09G 5/00* (2006.01)
*H04N 5/232* (2006.01)
*G01C 21/36* (2006.01)

(52) U.S. Cl.
CPC ............ *H04N 5/232* (2013.01); *G01C 21/3647* (2013.01); *G01C 21/367* (2013.01)

(58) Field of Classification Search
None
See application file for complete search history.

(56) References Cited

U.S. PATENT DOCUMENTS

2006/0293837 A1* 12/2006 Bennett .......................... 701/200
2010/0231777 A1* 9/2010 Shintani et al. ........... 348/333.06

FOREIGN PATENT DOCUMENTS

| JP | 2005-236883 | * 9/2005 | ............ H04N 5/232 |
|----|-------------|----------|------------------------|
| JP | 2005-236883 A | 9/2005 | |
| JP | 2010-219641 A | 9/2010 | |

* cited by examiner

*Primary Examiner* — James A Thompson
(74) *Attorney, Agent, or Firm* — Wolf, Greenfield & Sacks, P.C.

(57) ABSTRACT

An information processing apparatus may include at least one processor, at least one interface from the at least one processor to at least one sensor configured to detect an orientation of the apparatus, and at least one interface from the at least one processor to at least one display. The at least one processor may be configured to, in response to receiving input from the at least one sensor that indicates a change in the orientation of the apparatus within a time limit from an occurrence of an event, cause the at least one display to display one or more previously created photographs. An information processing method may include detecting an orientation of an apparatus having a display, and in response to detecting a change in the apparatus's orientation within a time limit from an occurrence of an event, displaying one or more previously created photographs on the display.

14 Claims, 8 Drawing Sheets

FIG.6

| Event | Displayed map |
|---|---|
| Normal photographing | Map with user position as center |
| Reception of photograph from friend | Map displaying all photographs of friends |
| Photographing in game mode | Map displaying game-playing place |
| Photographing in photo-rally mode | Map displaying next place to be checked |

INFORMATION PROCESSING APPARATUS, INFORMATION PROCESSING METHOD, AND PROGRAM

CROSS REFERENCE TO RELATED APPLICATION

This application claims the benefit of priority under 35 U.S.C. §119 to Japanese Priority Patent Application JP 2011-270250 filed in the Japan Patent Office on Dec. 9, 2011, the entire contents of which are hereby incorporated by reference.

BACKGROUND

The present disclosure relates to an information processing apparatus capable of performing photographing processing using a camera and displaying processing of map information, and to an information processing method and a program for the information processing apparatus.

In recent years, positioning technology using a GPS (Global Positioning System) and a wireless LAN (Local Area Network) has been widely used in an information processing apparatus in order to acquire position information. With this technology, position information is easily added to a photograph taken with a camera included in the information processing apparatus.

Meanwhile, a user wants to check, on a map, photographing position information of the photograph taken with the camera in some cases. However, the switching from a photographing mode (photographing view) to a reproduction mode such as a map mode (map view) is not easily performed, resulting in inconvenience for the user. Further, there arises a problem that when a photograph and a map are displayed on a single screen, it is difficult for a user to check photographing position information of many photographs in a portable device having a screen of a relatively small area, such as a smartphone, a mobile phone, and a digital still camera.

Japanese Patent Application Laid-open No. 2010-219641 (hereinafter, referred to as Patent Document 1) and Japanese Patent Application Laid-open No. 2005-236883 (hereinafter, referred to as Patent Document 2) are documents related to mode switching.

Patent Document 1 discloses the switching between a photographing mode and a reproduction mode in accordance with a change in posture of an imaging apparatus and a direction of an operation made on the imaging apparatus. In addition, Patent Document 2 discloses the switching between a photographing mode and a reproduction mode in accordance with a lateral posture or vertical posture of a digital camera. By those techniques, a user is allowed to easily switch the mode between a photographing mode and a reproduction mode with one hand.

SUMMARY

However, in the techniques disclosed in Patent Documents 1 and 2, the mode switching between the photographing or reproduction mode and a map mode, that is, to display map data in which a photograph is arranged is difficult to be realized.

Accordingly, one type of embodiment as described herein is directed to apparatus comprising: at least one processor; at least one interface from the at least one processor to at least one sensor configured to detect an orientation of the apparatus; and at least one interface from the at least one processor to at least one display; wherein the at least one processor is configured to, in response to receiving input from the at least one sensor that indicates a change in the orientation of the apparatus within a time limit from an occurrence of an event, cause the at least one display to display one or more previously created photographs.

Another type of embodiment is directed to a method comprising: detecting an orientation of an apparatus having a display; and in response to detecting a change in the orientation of the apparatus within a time limit from an occurrence of an event, displaying one or more previously created photographs on the display.

Another type of embodiment is directed to at least one computer-readable storage medium encoded with computer-executable instructions that, when executed, perform a method comprising: in response to at least one sensor detecting a change in orientation of an apparatus comprising the at least one sensor and a display, causing one or more previously created photographs to be displayed on the display.

As described above, according to the present disclosure, map data in which a taken photograph is arranged at a position corresponding to a photographing position thereof is easily displayed.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 6 is a table showing a relationship between a type of event and a map displayed in accordance with the type in the first embodiment of the present disclosure;

DETAILED DESCRIPTION OF EMBODIMENTS

Hereinafter, embodiments of the present disclosure will be described with reference to the drawings.

First Embodiment

A first embodiment of the present disclosure will first be described.

(Network Configuration)

Figure 1:
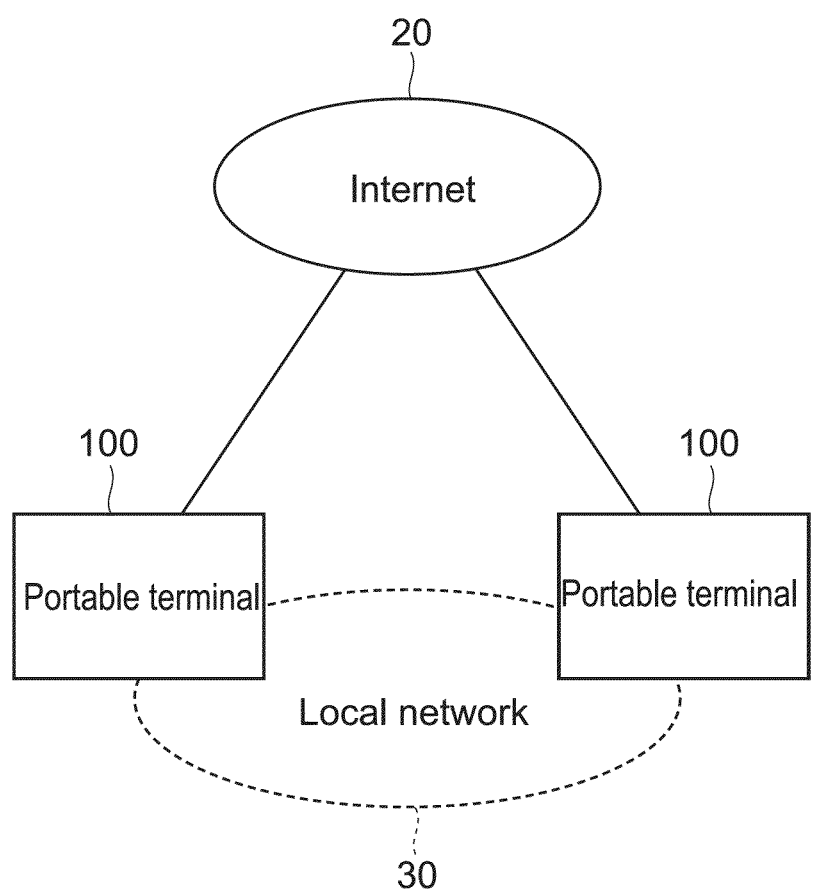
FIG. 1 is a diagram showing a network configuration in a first embodiment of the present disclosure.

FIG. 1 is a diagram showing a network configuration including a portable terminal according to this embodiment. Here, the portable terminal refers to an information processing apparatus such as, specifically, a smartphone, a mobile phone, a tablet PC (Personal Computer), a PDA (Personal Digital Assistant), a portable AV (Audio-Visual) player, an electronic book, or a digital still camera.

As shown in FIG. 1, a plurality of portable terminals 100 may communicate with one another in a peer-to-peer manner via an Internet 20 or a local network 30. The local network 30 may be a wireless LAN (Local Area Network) or 3G or 4G network for mobile communication.

Each portable terminal 100 exchanges, for example, photographic data captured by its camera with another portable terminal 100 via the Internet 20 or the local network 30.

(Hardware Configuration of Portable Terminal)

Figure 2:
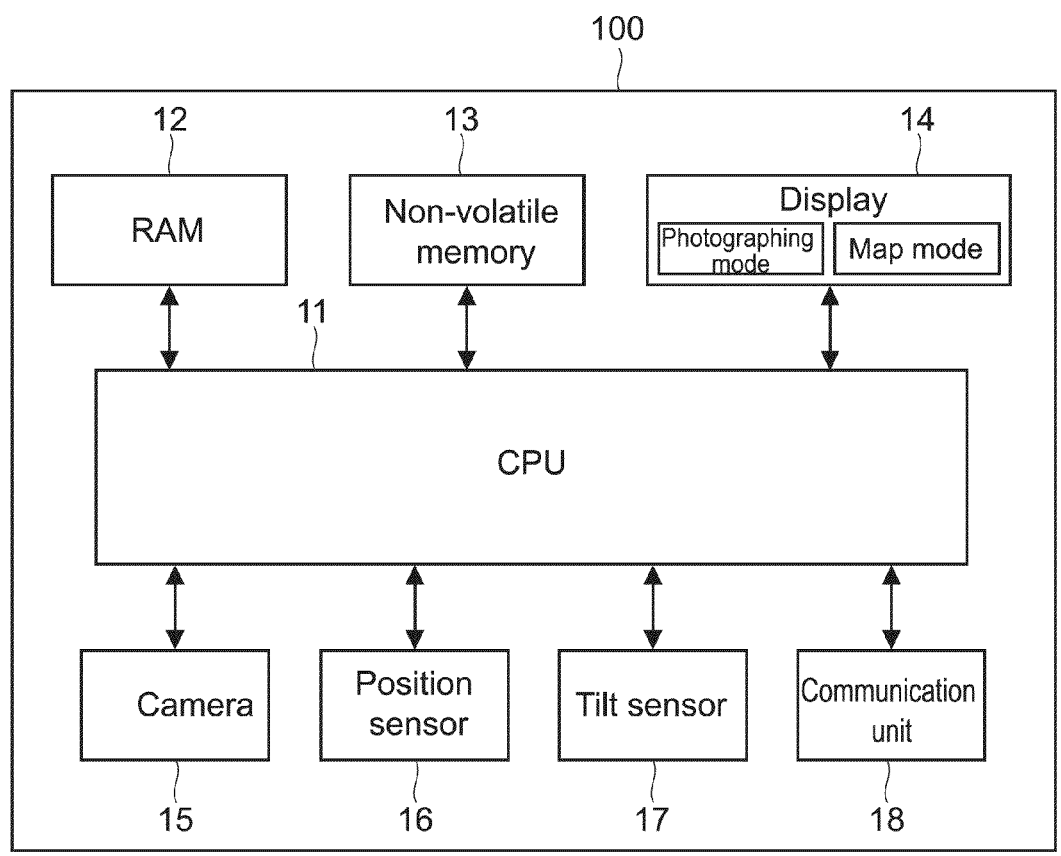
FIG. 2 is a diagram showing a hardware configuration of a portable terminal according to the first embodiment of the present disclosure.

FIG. 2 is a diagram showing a hardware configuration of the portable terminal 100.

As shown in FIG. 2, the portable terminal 100 includes at least one processor such as a CPU (Central Processing Unit) 11, a RAM (Random Access Memory) 12, a non-volatile memory 13, a display 14, a camera 15, a position sensor 16, at least one orientation-detecting sensor such as a tilt sensor 17, and a communication unit 18. The one or more processors may be communicatively coupled to any of the other components of portable terminal 100 via one or more interfaces.

The CPU 11 accesses the RAM 12 and the like when necessary and performs overall control on blocks of the portable terminal 100 while performing various types of computation processing. The RAM 12 is used as a work area and the like of the CPU 11 and temporarily stores an OS, various applications in execution, and various pieces of data being processed (photographic data, map data, and the like to be described later).

The non-volatile memory 13 is, for example, a flash memory or a ROM (Read Only Memory) and fixedly stores the OS to be executed by the CPU 11 and firmware including programs (applications), various parameters, and the like.

Further, the non-volatile memory 13 stores still-image data (photographic data) and moving-image data that are captured by the camera 15 or received from another device via the communication unit 18. The photographic data is stored with metadata such as data indicating a date and time of the photographing, position data (latitude/longitude data) indicating a photographing position, and data indicating climatic conditions at the photographing (temperature, humidity, atmospheric pressure, etc.) being added to the photographic data.

Map data may be stored in the non-volatile memory 13. However, the map data is typically acquired from a predetermined server on a network such as the Internet 20 and stored in the RAM 12, each time a map is requested for display in a map mode to be described later.

The display 14 is, for example, an LCD (Liquid Crystal Display) or an OELD (Organic Electroluminescence Display) and displays GUIs and the like of various menus and applications. In some embodiments, more than one display may be included. Further, the display 14 may be integrated with a touch panel.

In this embodiment, using the display 14, the CPU 11 executes at least a photographing mode capable of taking photographs with the camera 15 and a map mode capable of displaying map data in which taken photographs, received photographs, and the like are arranged. The display 14 displays an image in a finder during photographing or a taken photograph in the photographing mode, and displays a map in the map mode, thus switching display according to the modes. In addition, the CPU 11 executes a reproduction mode in which a taken photograph and moving image are reproduced. As used herein, the term "reproduction mode" refers to a mode in which previously created photographs (e.g., that are stored in RAM 12 and/or non-volatile memory 13) are displayed. In one example of a reproduction mode, a single photograph may be displayed on display 14. In another example of a reproduction mode, multiple photographs may be displayed, e.g., in a list with thumbnails of the photographs. In yet another example of a reproduction mode, one or more photographs or thumbnails of photographs may be displayed superimposed on map data, e.g., in a map mode.

The camera 15 captures a still image (photograph) and a moving image with use of an imaging device such as a CMOS (Complementary Metal Oxide Semiconductor) or a CCD (Charge Coupled Device) sensor.

The position sensor 16 is a GPS (Global Positioning System) sensor, for example. The position sensor 16 receives a GPS signal transmitted from, for example, a GPS satellite and outputs the GPS signal to the CPU 11. Based on the GPS signal, the CPU 11 detects a current position of the portable terminal 100. Further, the portable terminal 100 may detect its current position by performing trilateration with a base station by wireless communication of the communication unit 18, without using a GPS sensor. Data of the current position is used for the CPU 11 to determine an area of a map to be acquired in the map mode.

The tilt sensor 17 is, for example, an angular velocity (gyro) sensor, an acceleration sensor, or the like and detects a tilt of a casing of the portable terminal 100. Specifically, in this embodiment, the tilt sensor 17 detects a tilt angle, with respect to a horizontal plane, of a surface of the casing of the portable terminal 100, on which the display 14 is provided. A value of the tilt angle is used for switching processing between the photographing mode and the map mode.

The portable terminal 100 may also include, for example, a geomagnetic sensor that detects a direction (e.g., a compass direction such as north, south, east, west, etc.) in which the portable terminal 100 faces.

In some embodiments, one or more sensors such as tilt sensor 17 and/or a geomagnetic sensor may be configured to detect an orientation of portable terminal 100. As used herein, tilt and geomagnetic direction are examples of ways in which orientation, and/or changes in orientation, can be detected. Another example is detection of whether portable terminal 100 is in a landscape orientation or a portrait orientation. It should be appreciated that any suitable measure of orientation may be used, as some embodiments of the invention are not limited in this respect.

The communication unit 18 is an NIC (Network Interface Card), a wireless communication module, or the like for a wired connection with the Internet 20 or the local network 30. The communication unit 18 receives map data or receives and transmits photographic data via those networks, for example.

(Operation of Portable Terminal)

Next, operations of the portable terminal 100 configured as described above will be described. In the following description, the CPU 11 of the portable terminal 100 will be described as a main subject of the operations, but those operations are also performed in cooperation with programs executed under the control of the CPU 11.

(Basic Operation)

Figure 3:
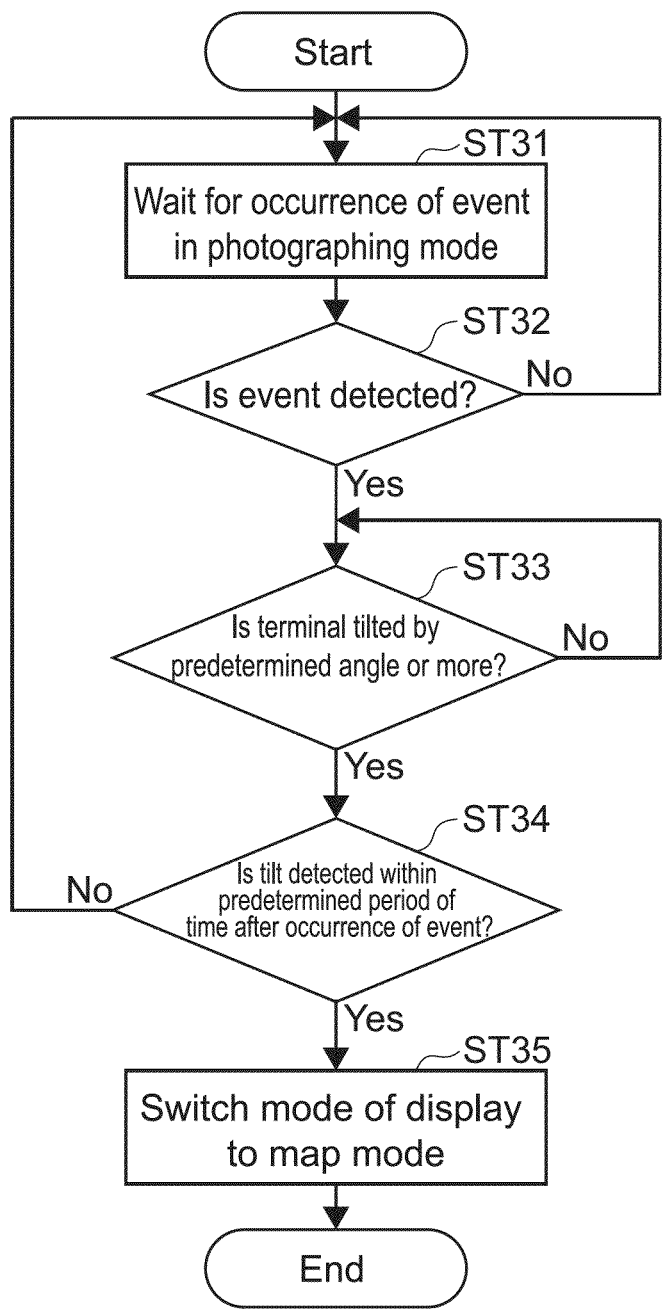
FIG. 3 is a flowchart showing a basic operation flow of the portable terminal according to the first embodiment of the present disclosure.

First, a basic operation flow of the portable terminal 100 in this embodiment will be described. FIG. 3 is a flowchart showing the operation flow.

As shown in FIG. 3, the CPU 11 of the portable terminal 100 executes the photographing mode and waits for the occurrence of some event (Step 31).

Examples of the event include an event of receiving a message transmitted from an external device and some operation made on the portable terminal 100 by a user (press of button etc.), but the event is not limited to those examples.

Subsequently, in the case where the CPU 11 detects some event (Yes of Step 32), the one or more orientation-detecting sensors may generate an input to the one or more processors indicating whether there has been a change in the orientation of portable terminal 100. For example, the tilt sensor 17 may determine whether a tilt of a predetermined angle or more of the portable terminal 100 is detected (Step 33). In another example, a sensor may determine whether portable terminal 100 has changed from landscape orientation to portrait orientation or vice versa.

In the case where a change of orientation is detected (Yes of Step 33), the CPU 11 determines whether the orientation change has been detected within a predetermined period of time after the occurrence of the event (e.g., within a time limit from the occurrence of the event) (Step 34). The predetermined period of time is, for example, 30 seconds, one minute, three minutes, or five minutes, but the predetermined period of time is not limited thereto.

Then, when detecting that the tilt has been detected within the predetermined period of time (Yes of Step 34), the CPU 11 switches the mode from the photographing mode to a reproduction mode (e.g., a photograph listing and/or displaying mode, or a map mode) and also switches display of the display 14 to cause display 14 to display one or more previously created photographs (Step 35). For example, the one or more processors may cause display 14 to display one or more previously created photographs alone, and/or in a list (e.g., with thumbnails), and/or superimposed on map data. In some embodiments, one or more previously created photographs or thumbnails may be superimposed on map data at positions corresponding to locations at which the photographs were taken.

Figure 4:
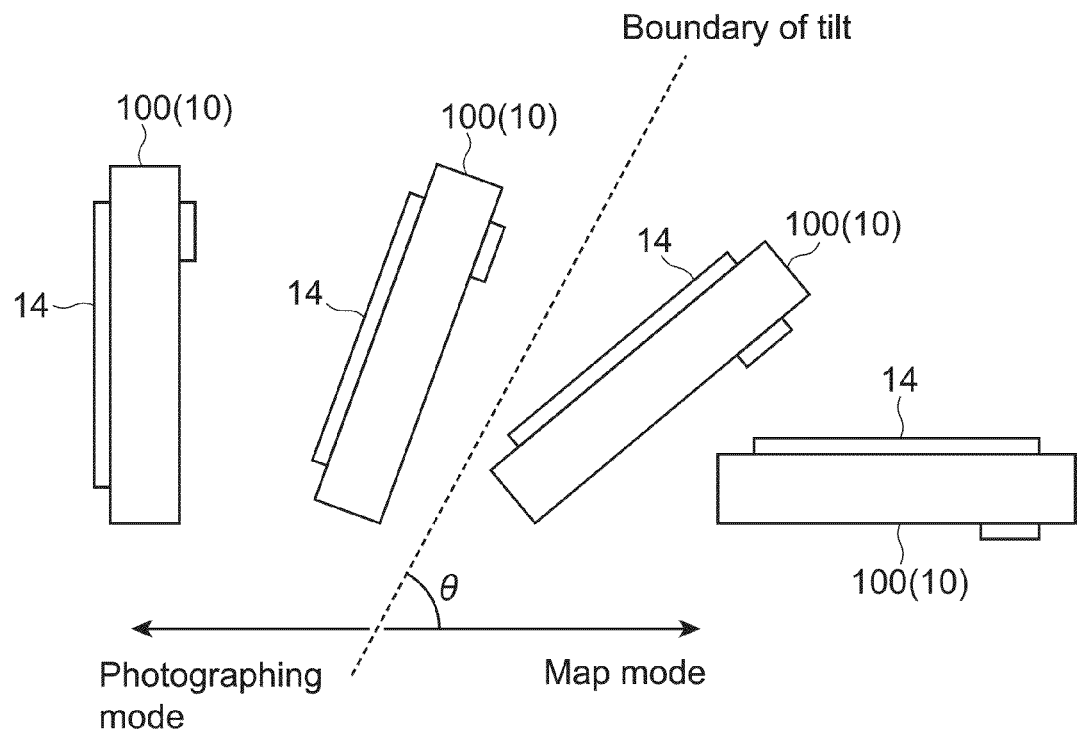
FIG. 4 is a diagram schematically showing a relationship between a tilt of the portable terminal according to the first embodiment of the present disclosure and a mode executed in accordance with the tilt.

FIG. 4 is a diagram schematically showing an example in which there is a relationship between a tilt of the portable terminal 100 and a mode executed in accordance with the tilt.

In the example shown in FIG. 4, when a tilt angle of a casing 10 of the portable terminal 100, i.e., an angle formed by a surface on which the display 14 is provided and the horizontal plane falls below a predetermined angle θ during execution of the photographing mode, the mode is switched to the map mode. After that, when the tilt angle exceeds the predetermined angle θ, the mode is switched from the map mode to the photographing mode. The predetermined angle θ is 45 degrees, for example, but the predetermined angle is not limited thereto.

Here, it may be possible to gradually switch the mode between the two modes while overlapping with each other, instead of binarily switching the mode between the two modes with the predetermined angle θ as a boundary. In other words, the CPU 11 may change a transparency (α value) of map data on the display 14 in accordance with, for example, the tilt angle of the portable terminal 100. Specifically, as the tilt angle from a vertical state increases (i.e., as the surface of the display 14 is tilted toward a horizontal direction from the vertical state), an α value of the map data is gradually decreased (i.e., the map data becomes gradually opaque). Then, in the case where the surface of the display 14 becomes horizontal, the screen of the finder in the photographing mode is not displayed at all, and only the map data is displayed in a perfect state.

As described above, in this embodiment, the portable terminal 100 switches the mode from the photographing mode to the map mode within a predetermined period of time after the occurrence of an event by a simple operation of a user tilting the portable terminal 100 by a predetermined angle or more. In other words, when the user merely tilts the portable terminal 100 by a predetermined angle or more within a predetermined period of time from a time of day at which an event has occurred, the mode is switched from the photographing mode to the map mode. In the case where the predetermined period of time has elapsed, the mode is not switched even when the user tilts the portable terminal 100 by a predetermined angle or more.

In this case, when an event is detected, the CPU 11 may display an icon indicating a state where switching to the map mode is executable (state capable of displaying map data) on the display 14. Accordingly, the user grasps at a glance whether the map mode is executable at that time point, which increases user-friendliness.

In some embodiments, even after the time limit from the occurrence of the event has passed, there may still be one or more ways for the user to cause portable terminal 100 to switch display modes by changing the orientation of the apparatus. For instance, in one example, even after the time limit has passed, a user may cause portable terminal 100 to switch from photographing mode to a reproduction mode by quickly or forcefully tilting the apparatus (e.g., changing the orientation of the apparatus with a rate of change greater than a threshold).

Figure 5:
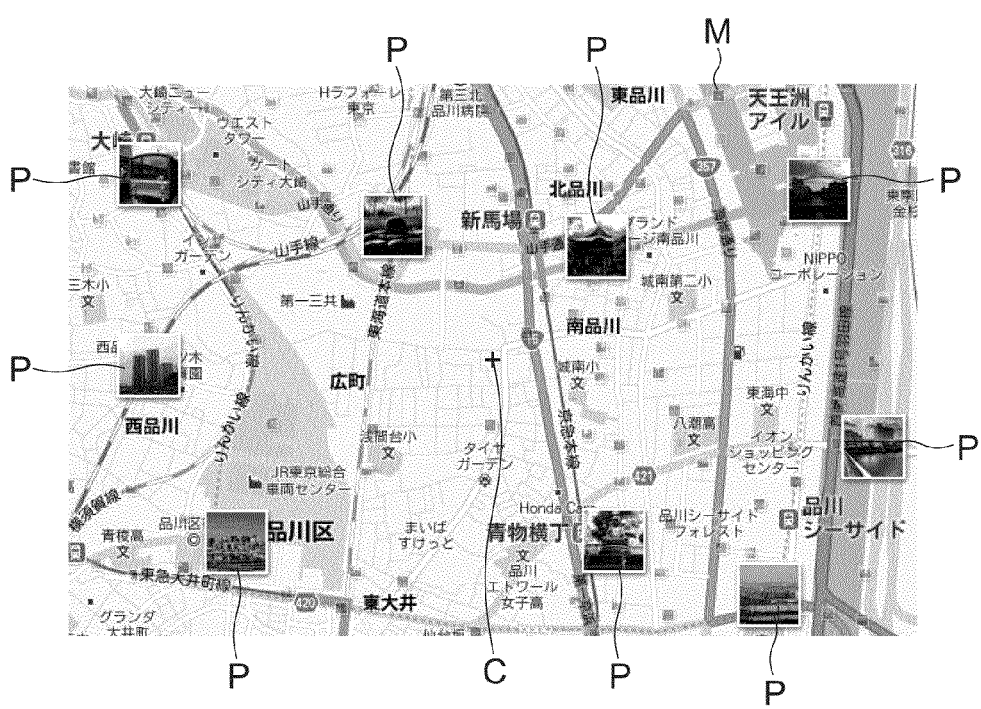
FIG. 5 is a diagram showing an example of a screen displayed on a display in a map mode in the first embodiment of the present disclosure.

FIG. 5 is a diagram showing an example of a screen displayed on the display 14 in the map mode.

As shown in FIG. 5, in the map mode, a map M of an area in which a current position C of the portable terminal 100 (user) acquired by the position sensor 16 is set to the center is displayed, for example. Then, on the map M, photographs P taken by the user of the portable terminal 100 or another user are displayed as thumbnails at positions corresponding to photographing positions of the photographs P. Accordingly, the user grasps at a glance the locations at which the photographs were taken by the user or another user on the map.

The photographs P are arranged at positions corresponding thereto on the map M, based on photographing position (location) data (latitude and longitude data) in the metadata of the photographs P. Though described later, a range of the map M to be displayed on the display 14 (scale of map) is changed in accordance with the photographing positions of the photographs P to be arranged on the map. In other words, the map is zoomed in or zoomed out such that all the photographs P capable of being arranged on the map are displayed. For example, in some embodiments, when a photograph is received from another apparatus, the map data may be displayed at a scale determined based on the location at which that photograph was taken.

(Relationship Between Event and Map)

Further, the area indicated in the map M is changed in accordance with the type of event that serves as a trigger for switching the mode to the map mode. FIG. 6 is a table showing a relationship between a type of event and a map displayed in accordance with the type.

As shown in FIG. 6, examples of event include normal photographing by the user, a reception of a photograph from a friend (user of another portable terminal), photographing in a game mode, and photographing in a photo-rally mode. The game mode refers to, for example, a mode in which game applications are executed, e.g., assuming that the user of the portable terminal 100 is located at a specific place, the user and other users determine the winner thereamong or work together towards the same goal. The photo-rally mode refers to, for example, a mode in which after presetting a plurality of places or buildings as places to be checked on the map, an application for taking photographs of the places to be checked is executed.

In the case where a change in orientation of the apparatus (for example, a tilt of a predetermined angle or more) is detected and the event is normal photographing by the user (e.g., creation of a photograph via the apparatus), a map in which the current position of the user (portable terminal 100) is set to the center is displayed. In the case were the event is a reception of a photograph from another apparatus (e.g., from a friend), a map may be displayed including the current position of the user and having its scale specified to encompass the location at which the received photograph was taken. In some embodiments, the map may be scaled to encompass locations at which a number of photographs received from other apparatuses were taken. For example, a map having a range of an area where photographs of friends are all displayed may be displayed. In the case where the event is photographing in a game mode, a map of a place where the game is being played is displayed. In the case where the event is photographing in a photo-rally mode, a map of the next place to be checked is displayed. In this case, each time the user takes a photograph in the photo-rally mode, whether the user reaches a place to be checked may be determined based on a comparison between a photographing position of the photograph and a position of the place to be checked, and according thereto, a map of the next place to be checked may be displayed.

In other words, in this embodiment, when the change in orientation is detected, the portable terminal 100 can change an area represented by map data to be displayed, based on the type of event such as a reception of a photograph or an execution of a specific application.

(Specific Example of Operation Based on Event)

Hereinafter, mode switching processing will be described along a specific example of the event. In this example, it is assumed that the user of the portable terminal 100 takes photographs together with nearby friends and photographs taken by them are shared in their portable terminals. In this case, the user of the portable terminal 100 may want to know where the photographs received from the portable terminals of the other users have been taken.

In this regard, in this example, when a photograph is received from another terminal, the switching to the map mode is allowed during a predetermined period of time after the reception.

Figure 7:
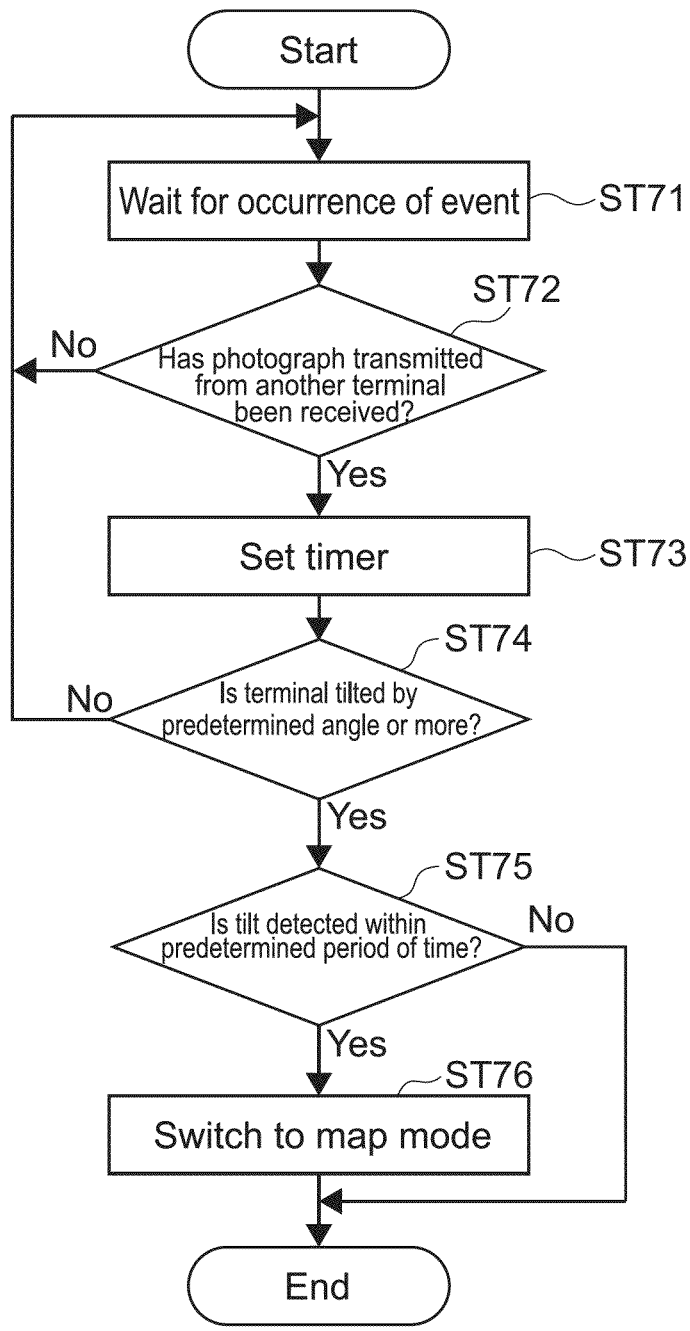
FIG. 7 is a flowchart showing a specific processing flow the of the portable terminal in the first embodiment of the present disclosure.

FIG. 7 is a flowchart showing a processing flow of the portable terminal 100 in this specific example.

As shown in FIG. 7, the CPU 11 of the portable terminal 100 first waits for the occurrence of some event during the execution of the photographing mode (Step 71).

Subsequently, the CPU 11 determines whether a reception of a photograph transmitted from another portable terminal has been detected as an event (Step 72).

In the case where a reception of a photograph has been detected (Yes), the CPU 11 sets a timer for limiting a time zone in which the map mode is displayed (Step 73).

Subsequently, the CPU 11 determines whether a tilt of a predetermined angle or more of the portable terminal 100 is detected (Step 74).

In the case where a tilt of a predetermined angle or more is detected (Yes), the CPU 11 determines whether a time counted by the timer falls within the predetermined period of time at a time point at which the tilt is detected (Step 75).

In the case where the time described above falls within the predetermined period of time (Yes), the CPU 11 switches the display of the display 14 from the photographing mode to the map mode (Step 76).

Specifically, the CPU 11 acquires, from the Internet 20, map data of a range including a position indicated by photographing position data added to the received photograph, and arranges a thumbnail of the received photograph at a corresponding position on the map data for display.

On the other hand, in the case where the time described above exceeds the predetermined period of time (No), the CPU 11 does not switch the mode and maintains the photographing mode.

As described above, in this specific example, the portable terminal 100 allows easy switching to the map mode at the time of the reception of photographs from other portable terminals and simultaneously limits the time during which the switching to the map mode is allowed, to thereby prevent the inconvenience or burden of the user constantly caused due to the switching to the map mode by an tilt.

(Scale Change Processing of Map Data)

Next, scale change processing of map data in this embodiment will be described. In this embodiment, the portable terminal 100 changes a scale of a map to be displayed, in accordance with a photographing position of a photograph received from another terminal.

Figure 8:
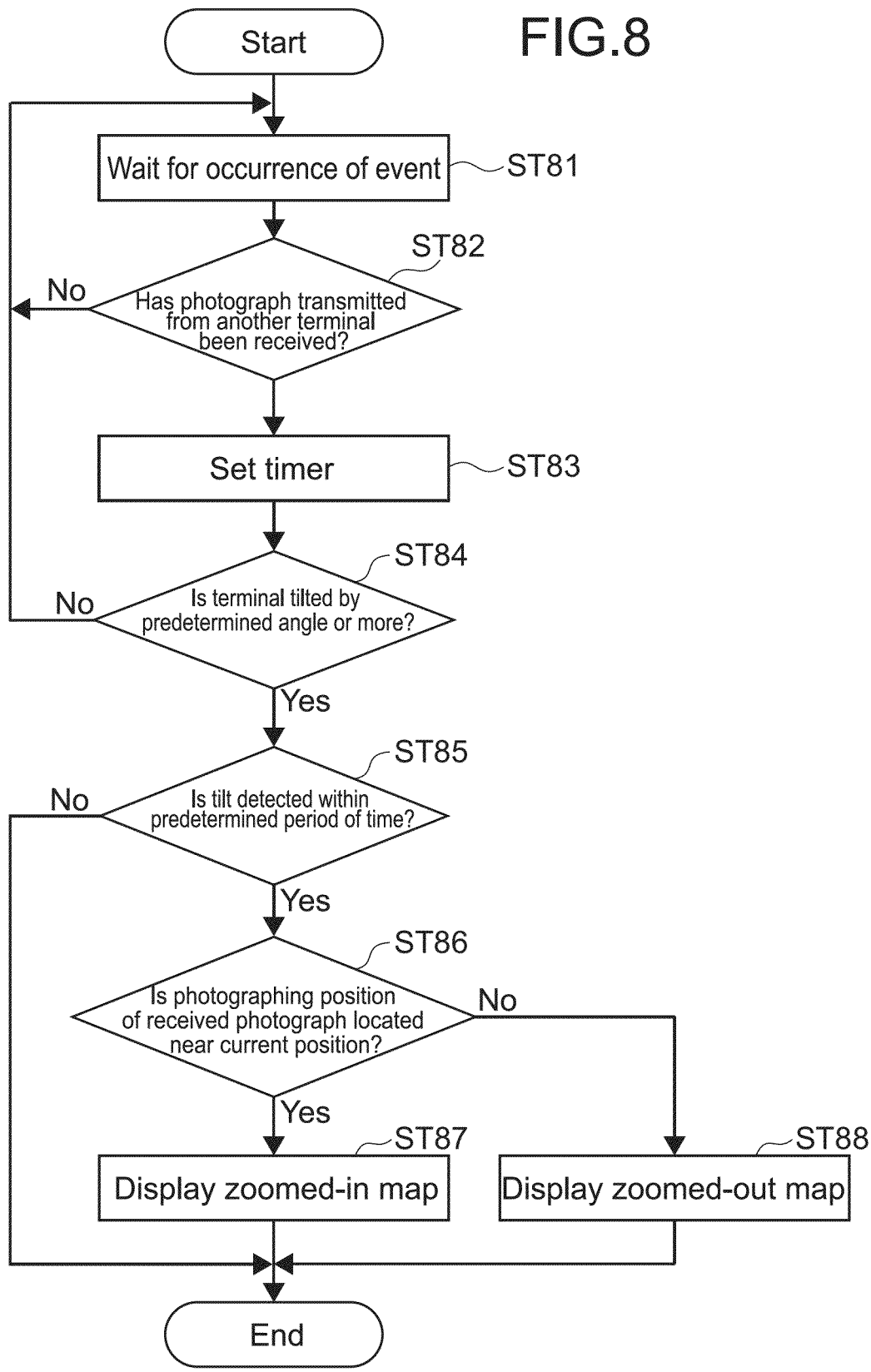
FIG. 8 is a flowchart showing a processing flow of changing a scale of map data in the first embodiment of the present disclosure.

FIG. 8 is a flowchart showing a processing flow of the portable terminal 100 in this specific example.

As shown in FIG. 8, the processing from Step 81 to Step 85 of this flowchart is the same as the processing from Step 71 to Step 75 of FIG. 7.

In Step 85, the time during which the tilt of the portable terminal 100 is detected falls within the predetermined period of time (Yes), the CPU 11 determines whether a photographing position of the received photograph is located near the current position of the portable terminal 100 (Step 86).

When determining that a photographing position of the received photograph is located near the current position of the portable terminal 100 (Yes), the CPU 11 displays a zoomed-in map (Step 87). On the other hand, when determining that a photographing position of the received photograph is not located near the current position of the portable terminal 100 (No), the CPU 11 displays a zoomed-out map (Step 88).

Specifically, the CPU 11 acquires map data including the current position of the portable terminal 100 acquired by the position sensor 16 and photographing position data added to the received photograph, from the Internet 20 or the non-volatile memory 13. The CPU 11 then changes the scale of the map data in such a size that the photographing position and the current position fall in the display 14 and in a size as large as possible.

In the case where a plurality of photographs are received, the CPU 11 takes into account photographing positions of all the photographs. Specifically, the CPU 11 calculates, based on coordinates of the current position and the photographing positions of all the photographs, a difference between a maximum value and a minimum value of each of the latitude (X coordinate) and the longitude (Y coordinate) and compares the differences after normalizing them at an aspect ratio of the display 14. Then, the CPU 11 adjusts the scale of the map data with respect to a larger difference of the differences of the normalized X coordinate and Y coordinate such that a point corresponding to the maximum value and a point corresponding to the minimum value are arranged at end portions of the display 14 in an X-axis direction or a Y-axis direction, thus arranging the photographs at the respective coordinates.

Then, the CPU 11 superimposes thumbnails of the photographs at positions corresponding to the photographing positions of those photographs on the size-changed map data for display.

As described above, in this specific example, the portable terminal 100 changes the scale of the map data in accordance with the photographing positions of the photographs, to thereby display all the photographs on the map data and display the photographs as large as possible.

Second Embodiment

Next, a second embodiment of the present disclosure will be described. In the first embodiment, the portable terminal 100 limits the state where the mode switching is allowed, based on a time. In this embodiment, however, the state is limited based on the number of received photographs.

Figure 9:
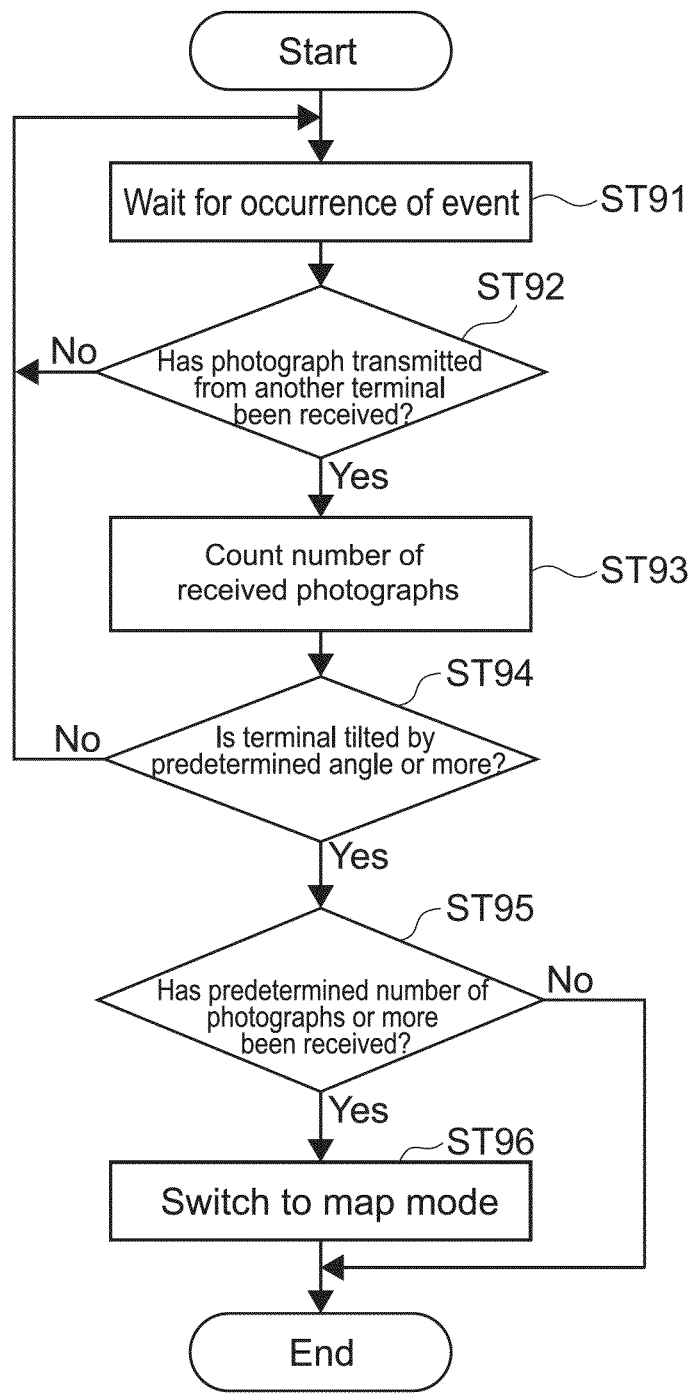
FIG. 9 is a flowchart showing a processing flow of the portable terminal in a second embodiment of the present disclosure.

FIG. 9 is a flowchart showing a processing flow of the portable terminal 100 in this embodiment.

As shown in FIG. 9, the CPU 11 of the portable terminal 100 first waits for the occurrence of some event during the execution of the photographing mode as in the case described above (Step 91) and determines whether a reception of a photograph transmitted from another portable terminal has been detected (Step 92).

In the case where a reception of a photograph has been detected (Yes), the CPU 11 counts the number of received photographs (Step 93). The number of photographs to be counted may be the total number of photographs received from a single terminal or the total number of photographs received from one or a plurality of terminals during a certain period of time.

Subsequently, the CPU 11 determines whether a change in orientation (for example, a tilt of a predetermined angle or more) of the portable terminal 100 is detected (Step 94).

In the case where a change in orientation is detected (Yes), the CPU 11 determines whether the portable terminal 100 has received a predetermined threshold number of photographs or more (Step 95).

When determining that the portable terminal 100 has received a predetermined number of photographs or more (Yes), the CPU 11 switches the display of the display 14 from the photographing mode to a reproduction mode (for example, to the map mode) (Step 96).

Specifically, the CPU 11 acquires map data of a range including all the positions indicated by photographing position data added to the predetermined number of received photographs or more, from the Internet 20 or the non-volatile memory 13. Then, the CPU 11 arranges thumbnails of the received photographs at the respective positions on the map data for display.

On the other hand, when determining that the number of received photographs does not satisfy the predetermined number (No), the CPU 11 does not switch the mode and maintains the photographing mode.

As described above, in this embodiment, the portable terminal 100 detects the fact that the predetermined number of photographs or more has been received, as an event, and accordingly determines whether the switching to the map mode is allowed. Accordingly, the portable terminal 100 can display map data only after receiving a certain amount of image data, which is enough to collectively check the image data on the map data. Therefore, the map data is prevented from being unnecessarily displayed due to the tilt of the portable terminal 100.

Modified Example

The present disclosure is not limited to the embodiments described above and may be variously modified without departing from the gist of the present disclosure.

In the embodiments described above, the examples of events are shown in FIG. 6, but as a matter of course the types of events are not limited thereto. For example, various events may be assumed, in which the number of photographs taken with the portable terminal 100 reaches a predetermined number, a certain period of time has elapsed after the start of the photographing mode, an application other than the specific application described above is executed, and the like.

In the embodiments described above, the example has been described, in which an icon indicating the fact that the switching to the map mode is executable (the fact that map data is allowed to be displayed) is displayed on the display 14 when an event is detected. However, in place of the icon, an audio that informs a user of the fact described above may be output from the informing portable terminal 100.

In the embodiments described above, the switching processing from the photographing mode to the map mode has been described, but switching processing from a mode other than the photographing mode to the map mode may be similarly executed. For example, the portable terminal 100 may execute the switching to the map mode based on the event and the detected tilt, during the execution of the reproduction mode for reproducing a taken photograph.

At least part of the processing of the portable terminal 100 described in the above embodiments may be executed with a device (server etc.) on the cloud. For example, the portable terminal 100 may notify the server on the cloud of the occurrence of an event or the detection of a tilt of a predetermined angle or more. Then, the server may create map data in which a photograph is arranged, based on the notification, and transmit it to the portable terminal 100.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments of the present invention comprises at least one computer-readable storage medium (i.e., a tangible, non-transitory computer-readable medium, such as a computer memory, a floppy disk, a compact disk, a magnetic tape, or other tangible, non-transitory computer-readable medium) encoded with a computer program (i.e., a plurality of instructions), which, when executed on one or more processors, performs above-discussed functions of embodiments of the present invention. The computer-readable storage medium can be transportable such that the program stored thereon can be loaded onto any computer resource to implement aspects of the present invention discussed herein. In addition, it should be appreciated that the reference to a computer program which, when executed, performs any of the above-discussed functions, is not limited to an application program running on a host computer. Rather, the term "computer program" is used herein in a generic sense to reference any type of computer code (e.g., software or microcode) that can be employed to program one or more processors to implement above-discussed aspects of the present invention.

(Others)

Embodiments of the present disclosure may take any of the following configurations.

1. Apparatus comprising: at least one processor; at least one interface from the at least one processor to at least one sensor configured to detect an orientation of the apparatus; and at least one interface from the at least one processor to at least one display; wherein the at least one processor is configured to, in response to receiving input from the at least one sensor that indicates a change in the orientation of the apparatus within a time limit from an occurrence of an event, cause the at least one display to display one or more previously created photographs.

2. The apparatus of configuration 1, wherein the at least one processor is configured to cause the at least one display to operate in a photographing mode until the input is received from the at least one sensor indicating the change in the orientation of the apparatus.

3. The apparatus of configuration 1, wherein the at least one processor is configured to cause the at least one display to display the one or more previously created photographs in a reproduction mode.

4. The apparatus of configuration 1, wherein the at least one processor is configured to cause the at least one display to display the one or more previously created photographs superimposed on map data.

5. The apparatus of configuration 4, wherein the at least one processor is configured to cause the at least one display to display the one or more previously created photographs superimposed on the map data at one or more positions corresponding to one or more locations at which the one or more previously created photographs were taken.

6. The apparatus of configuration 4, wherein the one or more previously created photographs comprise at least one photograph received from another apparatus, and wherein the at least one processor is configured to cause the at least one display to display the map data at a scale determined based on a location at which the at least one photograph was taken.

7. The apparatus of configuration 6, wherein the at least one processor is configured to specify the scale such that the displayed map data encompasses the location at which the at least one photograph was taken and a current position of the apparatus.

8. The apparatus of configuration 4, wherein the at least one processor is configured to cause the at least one display to display at least a portion of the map data centered on a current position of the apparatus, when the event comprises creation of a photograph via the apparatus.

9. The apparatus of configuration 4, wherein the at least one processor is configured to cause the at least one display to display a portion of the map data encompassing locations at which a plurality of photographs received from one or more other apparatuses were taken, when the event comprises reception of a photograph from another apparatus.

10. The apparatus of configuration 4, wherein the at least one processor is configured to cause the at least one display to display a portion of the map data encompassing a location at which a game is being played, when the event comprises creation of a photograph via the apparatus while the apparatus is in a game mode.

11. The apparatus of configuration 4, wherein the at least one processor is configured to cause the at least one display to display a portion of the map data encompassing a next place to be checked in a photo-rally, when the event comprises creation of a photograph via the apparatus while the apparatus is in a photo-rally mode.

12. The apparatus of configuration 1, wherein the at least one sensor comprises a tilt sensor, and wherein the input from the at least one sensor comprises input from the tilt sensor indicating a change in the orientation of the apparatus.

13. The apparatus of configuration 1, wherein the at least one sensor is configured to detect the orientation of the apparatus as an angle with respect to a horizontal plane.

14. The apparatus of configuration 1, wherein the input from the at least one sensor indicates that the apparatus has changed from landscape orientation to portrait orientation or vice versa.

15. The apparatus of configuration 1, wherein the at least one processor is further configured to, in response to receiving input from the at least one sensor that indicates a change in the orientation of the apparatus after the time limit has passed, cause the at least one display to display one or more previously created photographs.

16. The apparatus of configuration 1, wherein the at least one processor is configured to cause the at least one display to display the one or more previously created photographs in response to a determination that at least a threshold number of photographs have been received from one or more other apparatuses before the input is received from the at least one sensor indicating the change in the orientation of the apparatus.

17. A method comprising: detecting an orientation of an apparatus having a display; and in response to detecting a change in the orientation of the apparatus within a time limit from an occurrence of an event, displaying one or more previously created photographs on the display.

18. The method of configuration 17, further comprising operating the display in a photographing mode until the change in the orientation of the apparatus is detected.

19. The method of configuration 17, wherein displaying the one or more previously created photographs comprises displaying the one or more previously created photographs in a reproduction mode.

20. The method of configuration 17, wherein displaying the one or more previously created photographs comprises superimposing the one or more previously created photographs on map data.

21. The method of configuration 20, wherein displaying the one or more previously created photographs comprises superimposing the one or more previously created photographs on the map data at one or more positions corresponding to one or more locations at which the one or more previously created photographs were taken.

22. The method of configuration 20, wherein the one or more previously created photographs comprise at least one photograph received from another apparatus, and wherein displaying the one or more previously created photographs comprises displaying the map data at a scale determined based on a location at which the at least one photograph was taken.

23. The method of configuration 22, wherein displaying the one or more previously created photographs comprises specifying the scale such that the displayed map data encompasses the location at which the at least one photograph was taken and a current position of the apparatus.

24. The method of configuration 20, wherein displaying the one or more previously created photographs comprises displaying at least a portion of the map data centered on a current position of the apparatus, when the event comprises creation of a photograph via the apparatus.

25. The method of configuration 20, wherein displaying the one or more previously created photographs comprises displaying a portion of the map data encompassing locations at which a plurality of photographs received from one or more other apparatuses were taken, when the event comprises reception of a photograph from another apparatus.

26. The method of configuration 20, wherein displaying the one or more previously created photographs comprises displaying a portion of the map data encompassing a location at which a game is being played, when the event comprises creation of a photograph via the apparatus while the apparatus is in a game mode.

27. The method of configuration 20, wherein displaying the one or more previously created photographs comprises displaying a portion of the map data encompassing a next place to be checked in a photo-rally, when the event comprises creation of a photograph via the apparatus while the apparatus is in a photo-rally mode.

28. The method of configuration 17, wherein detecting the orientation of the apparatus comprises detecting a tilt of the apparatus.

29. The method of configuration 17, wherein detecting the orientation of the apparatus comprises detecting an angle of the apparatus with respect to a horizontal plane.

30. The method of configuration 17, wherein detecting a change in the orientation of the apparatus comprises detecting that the apparatus has changed from landscape orientation to portrait orientation or vice versa.

31. The method of configuration 17, further comprising, in response to detecting a change in the orientation of the apparatus after the time limit has passed, displaying one or more previously created photographs on the display.

32. The method of configuration 17, wherein the displaying is performed in response to determining that at least a threshold number of photographs have been received from one or more other apparatuses.

33. At least one computer-readable storage medium encoded with computer-executable instructions that, when executed, perform a method comprising: in response to at least one sensor detecting a change in orientation of an apparatus comprising the at least one sensor and a display, causing one or more previously created photographs to be displayed on the display.

34. The at least one computer-readable storage medium of configuration 33, wherein the method further comprises operating the display in a photographing mode until the change in the orientation of the apparatus is detected.

35. The at least one computer-readable storage medium of configuration 33, wherein displaying the one or more previously created photographs comprises displaying the one or more previously created photographs in a reproduction mode.

36. The at least one computer-readable storage medium of configuration 33, wherein displaying the one or more previously created photographs comprises superimposing the one or more previously created photographs on map data.

37. The at least one computer-readable storage medium of configuration 36, wherein displaying the one or more previously created photographs comprises superimposing the one or more previously created photographs on the map data at one or more positions corresponding to one or more locations at which the one or more previously created photographs were taken.

38. The at least one computer-readable storage medium of configuration 36, wherein the one or more previously created photographs comprise at least one photograph received from another apparatus, and wherein displaying the one or more previously created photographs comprises displaying the map data at a scale determined based on a location at which the at least one photograph was taken.

39. The at least one computer-readable storage medium of configuration 38, wherein displaying the one or more previously created photographs comprises specifying the scale such that the displayed map data encompasses the location at which the at least one photograph was taken and a current position of the apparatus.

40. The at least one computer-readable storage medium of configuration 36, wherein displaying the one or more previously created photographs comprises displaying at least a portion of the map data centered on a current position of the apparatus, when the event comprises creation of a photograph via the apparatus.

41. The at least one computer-readable storage medium of configuration 36, wherein displaying the one or more previously created photographs comprises displaying a portion of the map data encompassing locations at which a plurality of photographs received from one or more other apparatuses were taken, when the event comprises reception of a photograph from another apparatus.

42. The at least one computer-readable storage medium of configuration 36, wherein displaying the one or more previously created photographs comprises displaying a portion of the map data encompassing a location at which a game is being played, when the event comprises creation of a photograph via the apparatus while the apparatus is in a game mode.

43. The at least one computer-readable storage medium of configuration 36, wherein displaying the one or more previously created photographs comprises displaying a portion of the map data encompassing a next place to be checked in a photo-rally, when the event comprises creation of a photograph via the apparatus while the apparatus is in a photo-rally mode.

44. The at least one computer-readable storage medium of configuration 33, wherein detecting the orientation of the apparatus comprises detecting a tilt of the apparatus.

45. The at least one computer-readable storage medium of configuration 33, wherein detecting the orientation of the apparatus comprises detecting an angle of the apparatus with respect to a horizontal plane.

46. The at least one computer-readable storage medium of configuration 33, wherein detecting a change in the orientation of the apparatus comprises detecting that the apparatus has changed from landscape orientation to portrait orientation or vice versa.

47. The at least one computer-readable storage medium of configuration 33, wherein the method further comprises, in response to detecting a change in the orientation of the apparatus after the time limit has passed, displaying one or more previously created photographs on the display.

48. The at least one computer-readable storage medium of configuration 33, wherein the displaying is performed in response to determining that at least a threshold number of photographs have been received from one or more other apparatuses.

The phraseology and terminology used herein is for the purpose of description and should not be regarded as limiting. The use of "including," "comprising," "having," "containing", "involving", and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements from each other.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. Apparatus comprising:
    at least one processor;
    at least one interface from the at least one processor to at least one sensor configured to detect an orientation of the apparatus; and
    at least one interface from the at least one processor to at least one display;
    wherein the at least one processor is configured to, in response to receiving input from the at least one sensor that indicates a change in the orientation of the apparatus within a time limit from an occurrence of an event, cause the at least one display to display one or more previously created photographs superimposed on map data at one or more positions corresponding to one or more locations at which the one or more previously created photographs were taken.

2. The apparatus of claim 1, wherein the at least one processor is configured to cause the at least one display to operate in a photographing mode until the input is received from the at least one sensor indicating the change in the orientation of the apparatus.

3. The apparatus of claim 1, wherein the at least one processor is configured to cause the at least one display to display the one or more previously created photographs in a reproduction mode.

4. The apparatus of claim 1, wherein the at least one sensor comprises a tilt sensor, and wherein the input from the at least one sensor comprises input from the tilt sensor indicating a change in the orientation of the apparatus.

5. The apparatus of claim 1, wherein the at least one sensor is configured to detect the orientation of the apparatus as an angle with respect to a horizontal plane.

6. The apparatus of claim 1, wherein the input from the at least one sensor indicates that the apparatus has changed from landscape orientation to portrait orientation or vice versa.

7. The apparatus of claim 1, wherein the at least one processor is further configured to, in response to receiving input from the at least one sensor that indicates a change in the orientation of the apparatus after the time limit has passed, cause the at least one display to display one or more previously created photographs.

8. Apparatus comprising:
    at least one processor;
    at least one interface from the at least one processor to at least one sensor configured to detect an orientation of the apparatus; and
    at least one interface from the at least one processor to at least one display;
    wherein the at least one processor is configured to, in response to receiving input from the at least one sensor that indicates a change in the orientation of the apparatus within a time limit from an occurrence of an event, cause the at least one display to display one or more previously created photographs superimposed on map data;
    wherein the one or more previously created photographs comprise at least one photograph received from another apparatus; and
    wherein the at least one processor is configured to cause the at least one display to display the map data at a scale determined based on a location at which the at least one photograph was taken.

9. The apparatus of claim 8, wherein the at least one processor is configured to specify the scale such that the displayed map data encompasses the location at which the at least one photograph was taken and a current position of the apparatus.

10. Apparatus comprising:
    at least one processor;
    at least one interface from the at least one processor to at least one sensor configured to detect an orientation of the apparatus; and
    at least one interface from the at least one processor to at least one display;
    wherein the at least one processor is configured to, in response to receiving input from the at least one sensor that indicates a change in the orientation of the apparatus within a time limit from an occurrence of an event, cause the at least one display to display one or more previously created photographs superimposed on map data; and
    wherein the at least one processor is configured to cause the at least one display to display at least a portion of the map data centered on a current position of the apparatus, when the event comprises creation of a photograph via the apparatus.

11. Apparatus comprising:
    at least one processor;
    at least one interface from the at least one processor to at least one sensor configured to detect an orientation of the apparatus; and
    at least one interface from the at least one processor to at least one display;
    wherein the at least one processor is configured to, in response to receiving input from the at least one sensor that indicates a change in the orientation of the apparatus within a time limit from an occurrence of an event, cause the at least one display to display one or more previously created photographs superimposed on map data; and
    wherein the at least one processor is configured to cause the at least one display to display a portion of the map data encompassing locations at which a plurality of photographs received from one or more other apparatuses were taken, when the event comprises reception of a photograph from another apparatus.

12. Apparatus comprising:
    at least one processor;
    at least one interface from the at least one processor to at least one sensor configured to detect an orientation of the apparatus; and
    at least one interface from the at least one processor to at least one display;
    wherein the at least one processor is configured to, in response to receiving input from the at least one sensor that indicates a change in the orientation of the apparatus within a time limit from an occurrence of an event, cause the at least one display to display one or more previously created photographs superimposed on map data; and
    wherein the at least one processor is configured to cause the at least one display to display a portion of the map data encompassing a location at which a game is being played, when the event comprises creation of a photograph via the apparatus while the apparatus is in a game mode.

13. Apparatus comprising:

at least one processor;

at least one interface from the at least one processor to at least one sensor configured to detect an orientation of the apparatus; and at least one interface from the at least one processor to at least one display;

wherein the at least one processor is configured to, in response to receiving input from the at least one sensor that indicates a change in the orientation of the apparatus within a time limit from an occurrence of an event, cause the at least one display to display one or more previously created photographs superimposed on map data; and wherein the at least one processor is configured to cause the at least one display to display a portion of the map data encompassing a next place to be checked in a photo-rally, when the event comprises creation of a photograph via the apparatus while the apparatus is in a photo-rally mode.

14. Apparatus comprising:

at least one processor;

at least one interface from the at least one processor to at least one sensor configured to detect an orientation of the apparatus; and at least one interface from the at least one processor to at least one display;

wherein the at least one processor is configured to, in response to receiving input from the at least one sensor that indicates a change in the orientation of the apparatus within a time limit from an occurrence of an event, cause the at least one display to display one or more previously created photographs; and wherein the at least one processor is configured to cause the at least one display to display the one or more previously created photographs in response to a determination that at least a threshold number of photographs have been received from one or more other apparatuses before the input is received from the at least one sensor indicating the change in the orientation of the apparatus.

* * * * *